(12) United States Patent
Oh et al.

(10) Patent No.: US 7,098,562 B2
(45) Date of Patent: Aug. 29, 2006

(54) AMBIDEXTROUS ELECTRONIC WINDOW LIFT MOTOR

(75) Inventors: JonYeon Oh, Suwanee, GA (US); Barry Anderson, Suwanee, GA (US); Martin Bass, Wuerzburg (DE)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 539 days.

(21) Appl. No.: 10/379,961

(22) Filed: Mar. 5, 2003

(65) Prior Publication Data

US 2004/0164634 A1 Aug. 26, 2004

Related U.S. Application Data

(60) Provisional application No. 60/446,315, filed on Feb. 10, 2003.

(51) Int. Cl.
*H02K 7/06* (2006.01)
*F16H 25/12* (2006.01)

(52) U.S. Cl. ............................. 310/80; 74/89; 74/89.34
(58) Field of Classification Search ............... 74/606 R, 74/608, 609, 89, 89.23, 89.34; 310/80, 83, 310/89, 20
See application file for complete search history.

(56) References Cited

U.S. PATENT DOCUMENTS

| | | | | |
|---|---|---|---|---|
| 4,004,168 A | * | 1/1977 | Haydon ........................ 310/41 |
| 4,347,755 A | | 9/1982 | Becker et al. ............. 74/421 A |
| 4,367,660 A | | 1/1983 | Becker et al. ................. 74/625 |
| 4,381,625 A | | 5/1983 | Andrei-Alexandru et al. 49/280 |
| 4,398,135 A | * | 8/1983 | Busch et al. ................. 318/443 |
| 4,420,703 A | | 12/1983 | Adam et al. ........... 310/154.36 |
| 4,643,040 A | | 2/1987 | Adam et al. ................... 74/425 |
| 5,111,715 A | * | 5/1992 | Farris ........................ 74/606 R |
| 5,144,183 A | | 9/1992 | Farrenkopf ................. 310/268 |
| 5,307,704 A | | 5/1994 | Muller et al. ................. 74/411 |
| 5,440,186 A | | 8/1995 | Forsell et al. ................ 310/239 |
| 5,528,093 A | | 6/1996 | Adam et al. ................... 310/89 |
| 5,764,010 A | | 6/1998 | Maue et al. ................. 318/443 |
| 5,836,219 A | | 11/1998 | Klingler et al. ........... 74/606 R |
| 5,907,885 A | | 6/1999 | Tilli et al. .................. 15/250.6 |
| 5,920,158 A | | 7/1999 | Miller et al. ................... 318/4 |
| 5,977,678 A | * | 11/1999 | Miller et al. ................. 310/103 |
| 5,979,256 A | | 11/1999 | Kilker et al. .............. 74/89.16 |
| 5,984,695 A | | 11/1999 | Riehl et al. ................. 439/76.1 |
| 6,014,915 A | | 1/2000 | Evans ....................... 74/606 R |
| 6,018,223 A | | 1/2000 | Oruganty et al. ............. 318/10 |
| 6,075,298 A | | 6/2000 | Maue et al. ................... 310/12 |
| 6,114,781 A | * | 9/2000 | Hazelton et al. .............. 310/12 |
| 6,116,110 A | | 9/2000 | Maue et al. .............. 74/471 R |
| 6,182,523 B1 | | 2/2001 | Nomerange ................. 74/411 |
| 6,393,929 B1 | | 5/2002 | Quere et al. ................. 74/411 |
| 6,397,006 B1 | * | 5/2002 | Sasaki et al. ................. 396/30 |
| 6,449,798 B1 | | 9/2002 | Rivin et al. ................ 15/250.3 |
| 2002/0046503 A1 | | 4/2002 | Mersch ........................ 49/502 |
| 2002/0189386 A1 | | 12/2002 | Greubel ....................... 74/425 |

FOREIGN PATENT DOCUMENTS

DE 19819996 A1 11/1999
GB 2040389 A 8/1980

OTHER PUBLICATIONS

Phelan, "Automakers rush to commonize interior parts", May, 1998.
PCT International Search Report mailed Jul. 22, 2004 (PCT/US2004/001418).

* cited by examiner

*Primary Examiner*—Thanh Lam
*Assistant Examiner*—Judson H. Jones

(57) ABSTRACT

A motor assembly 30 includes an electric motor 32 having a rotatable shaft 40, the shaft 40 having a worm 38; and a gear unit 33 operatively associated with the motor, the gear unit has first and second opposing ends. The gear unit 33 includes a gearwheel 36 operatively coupled with the worm 38 of the shaft 40 such that rotation of the shaft rotates the gearwheel. A driver 42 is operatively coupled with gearwheel so as to rotate therewith. The driver 42 is constructed and arranged to provide a driving member 43, 44 accessible at each of the first and second ends of the gear unit.

13 Claims, 4 Drawing Sheets

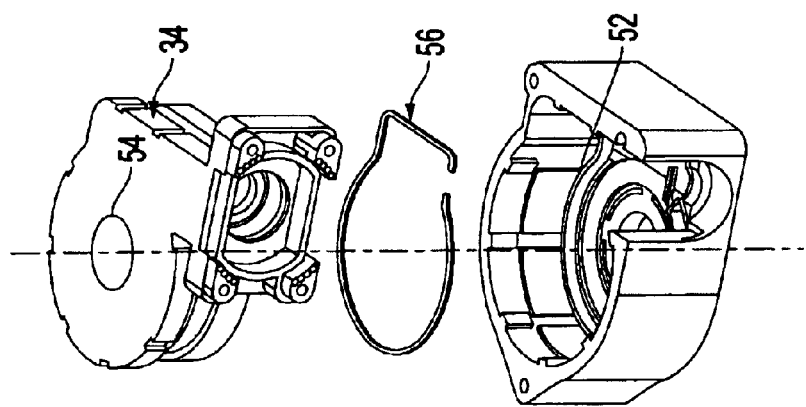
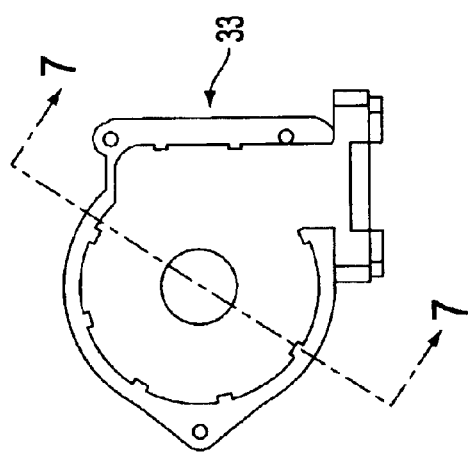
FIG. 5
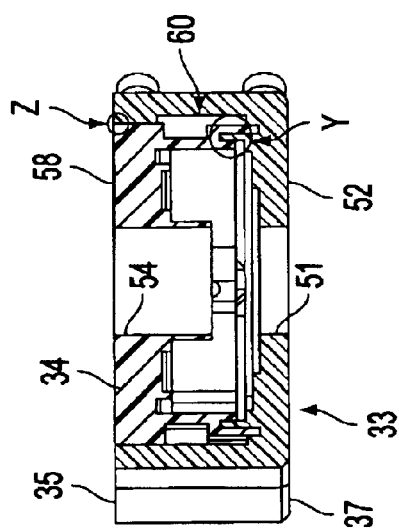
FIG. 6
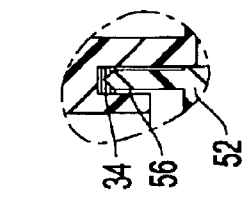
FIG. 8
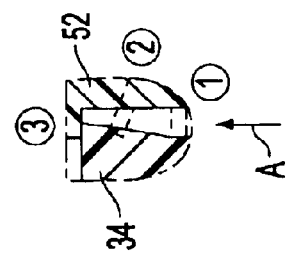
FIG. 7
FIG. 9

AMBIDEXTROUS ELECTRONIC WINDOW LIFT MOTOR

This application is based on U.S. Provisional Application No. 60/446,315, filed on Feb. 10, 2003, and claims the benefit thereof for priority purposes.

FIELD OF THE INVENTION

The invention relates to bi-directional electric motors and, more particularly, to a gear unit for a motor assembly that replaces the need for the conventional right hand and left hand window lift motor assemblies.

BACKGROUND OF THE INVENTION

Currently, with regard to window lift motor assemblies for vehicles, customers require both a left hand motor assembly 5 and a right hand motor assembly 6 as shown in FIGS. 1 and 2, respectively. Thus, the customer needs to distinguish between two different motor assemblies. The need for two different motor assemblies increases tooling costs and set-up cost of an assembly line.

An exploded view of a conventional window lift motor assembly is shown in FIG. 3. An electric motor 10 is coupled to a gear housing 12. The gear housing contains a gear axle 14 that carries a gearwheel 16 for rotation. The gearwheel 16 is rotated via a worm 20 the motor 10. Rotation of the gearwheel 16 rotates a driver 18. The driver 18 is coupled to a customer's drumhousing to move a window. A shock absorber 22 between the gearwheel 16 and driver 18 acts as a dampener at the maximum torsional load. With this structure, it is possible that the motor 10 will lock-up if the gear axle 14 bends due to high torque generated from the motor since the center to center distance between the gear axle and worm shaft of the motor increases beyond a given specification.

Further, in the motor assembly of FIG. 3, to provide a leak proof configuration, a coverplate 24 is coupled to the gear housing 12 via an interference fit between plastic and rubber materials. This configuration requires very tight tolerances and thus adds to the cost of the assembly.

Accordingly, there is a need to provide a gear unit for a motor assembly that can be used in place of both left and right hand window lift motor assemblies, that eliminates the gear axle, and that has an improved cover connection.

SUMMARY OF THE INVENTION

An object of the invention is to fulfill the need referred to above. In accordance with the principles of the present invention, this objective is achieved by a motor assembly including an electric motor having a rotatable shaft, the shaft having a worm; and a gear unit operatively associated with the motor, the a gear unit has first and second opposing ends. The gear unit includes a gearwheel operatively coupled with the worm of the shaft such that rotation of the shaft rotates the gearwheel. A driver is operatively coupled with gearwheel so as to rotate therewith. The driver is constructed and arranged to provide a driving member accessible at each of the first and second ends of the gear unit.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which:

FIG. 5 is an exploded view of a cover structure being coupled with the gear housing.

FIG. 6 is a plan view of the gear housing with cover structure attached.

FIG. 7 is a sectional view taken along the line 7—7 of FIG. 6.

FIG. 8 is an enlarged view of the portion encircled at Z in FIG. 7.

FIG. 9 is an enlarged view of the portion encircled at Y in FIG. 7.

DETAILED DESCRIPTION OF THE EXEMPLARY EMBODIMENT

Figures 1, 2:
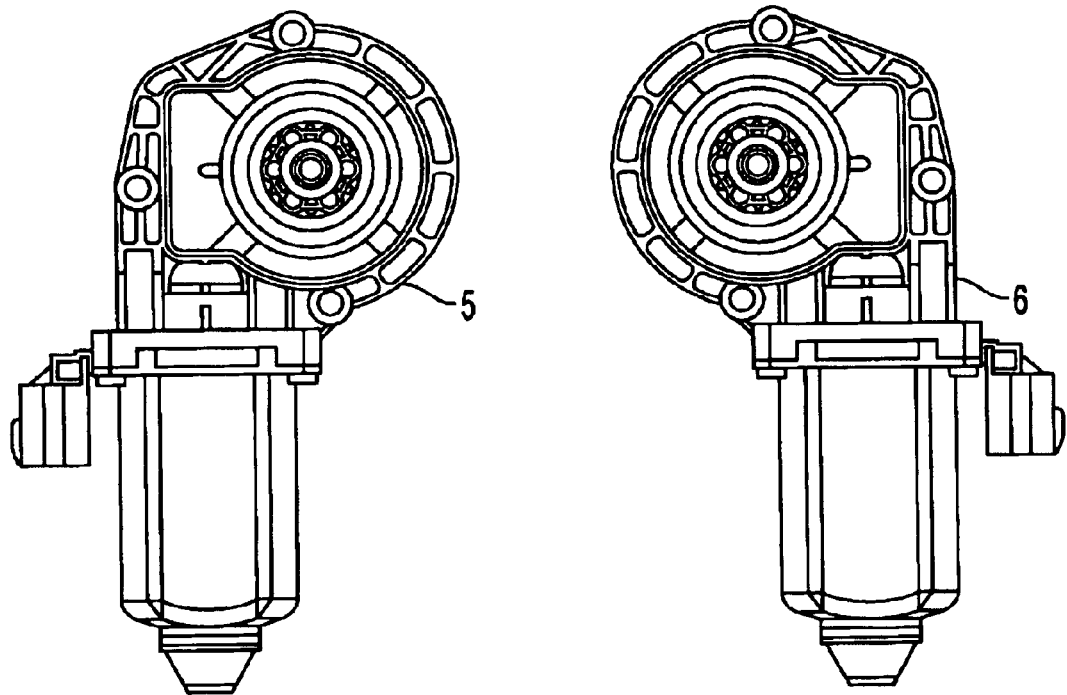
FIG. 1 is a plan view of a conventional left-handed window lift motor assembly.
FIG. 2 is a plan view of a conventional right-handed window lift motor assembly.
Figure 3:
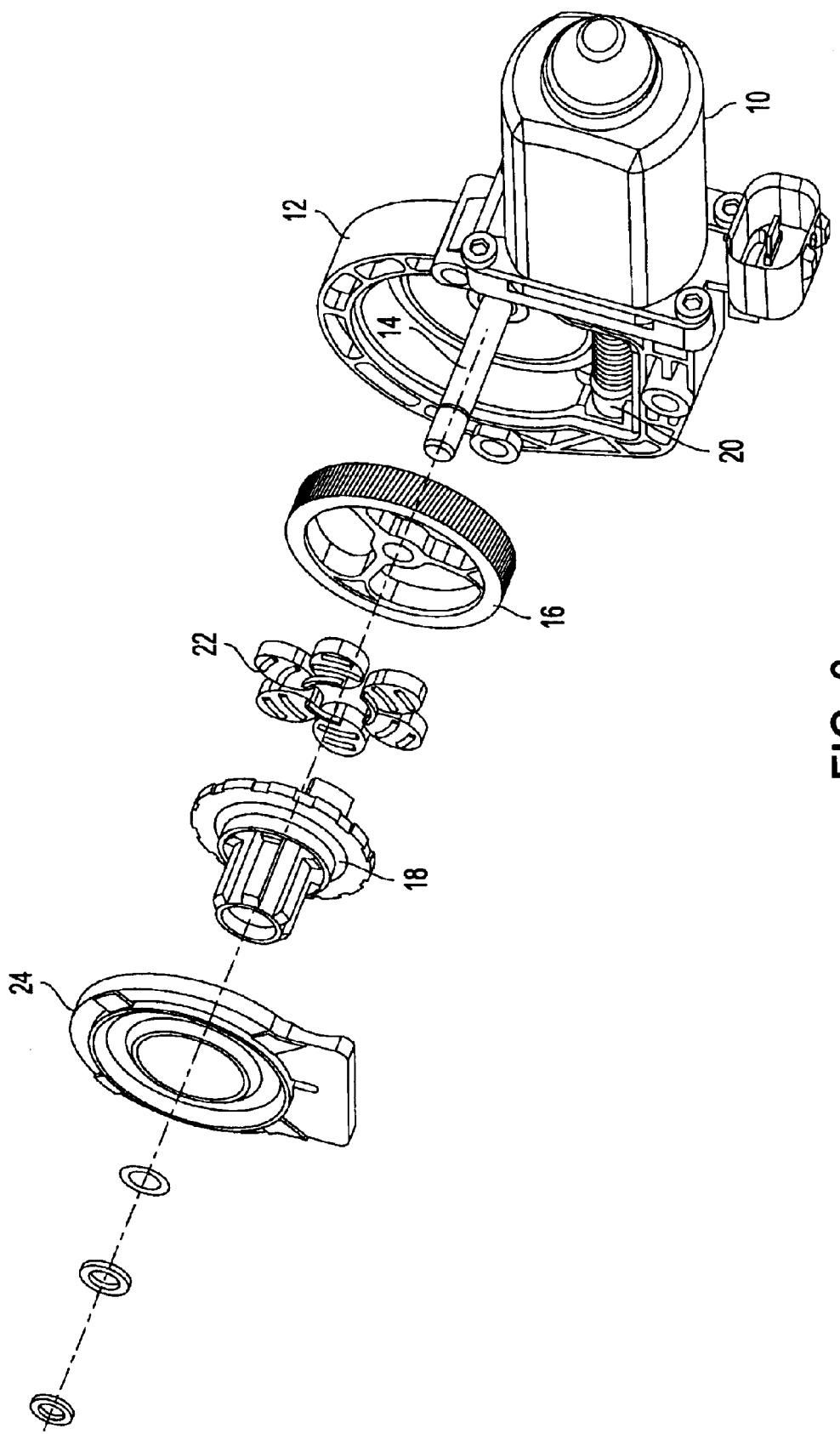
FIG. 3 is an exploded view of a conventional window lift motor assembly.
Figure 4:
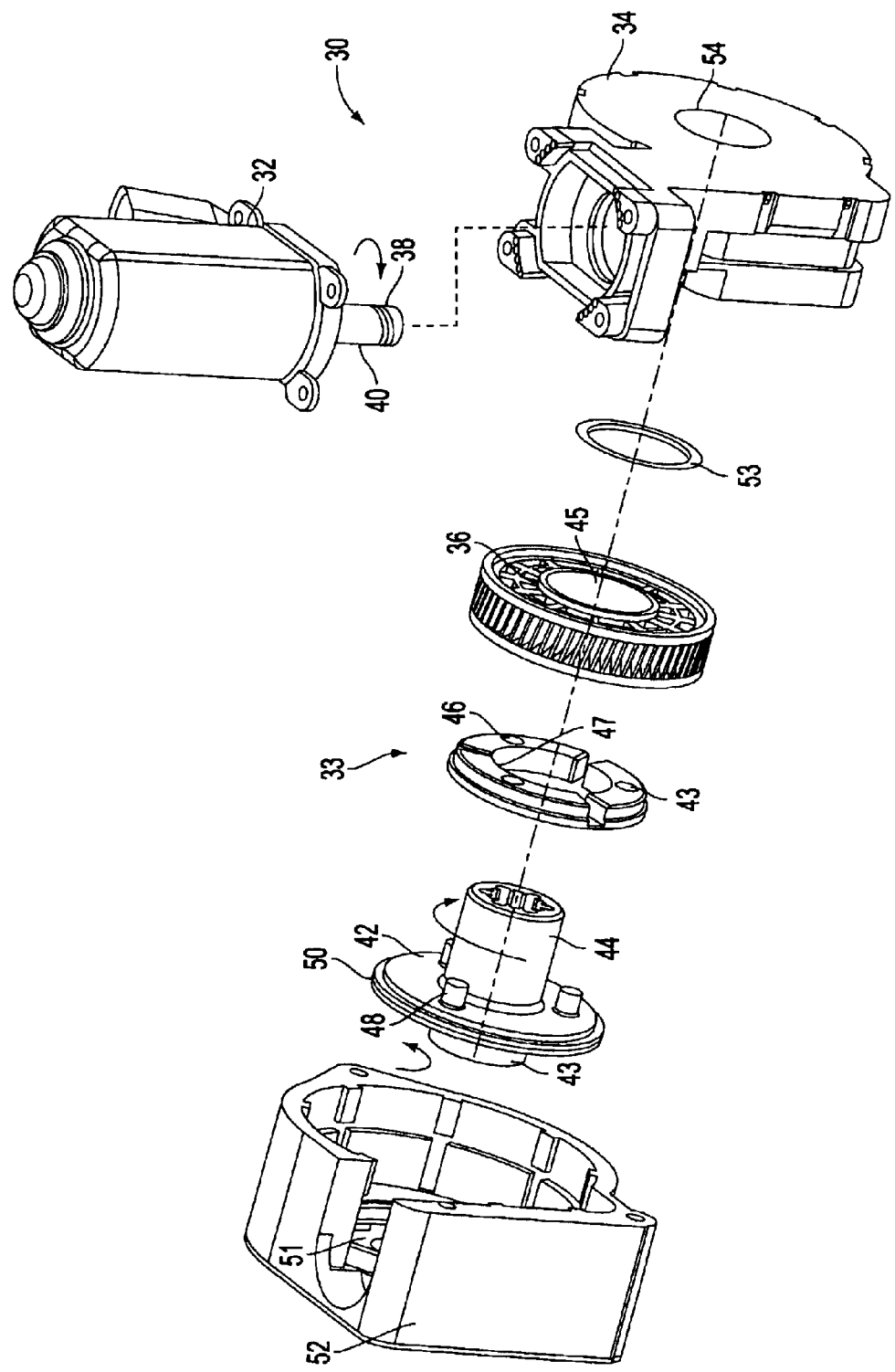
FIG. 4 is an exploded view of a window lift motor assembly provided in accordance with the principles of the present invention.

With reference to FIG. 4, a motor assembly, provided in accordance with the invention, is shown generally indicated at 30. The motor assembly 30 is a bi-directional motor assembly particularly useful in window-lift systems in vehicles. The motor assembly includes an electric motor 32 coupled with a gear unit, generally indicated at 33. The gear unit 33 includes a gear housing 34, a gear wheel 36 cooperatively associated with a worm 38 of shaft 40 of motor 32. A driver 42 is operatively associated with the gear wheel 36. The driver 42 has a generally cylindrical flange 50 and includes driving members 43 and 44 extending from the flange 50 in opposing directions. Thus the driving members 43 and 44 define opposing ends of the driver 42. The driving member 44 is generally cylindrical and the gearwheel 36 includes an opening 45 there through that receives the generally cylindrical driving member 44. Thus, there is no need for a gear axle 14 to support the gearwheel, as in conventional motor assemblies (FIG. 3).

A shock absorber 46 is mounted via protrusions or studs 48 extending from the flange 50 of the driver 42. Thus, openings 43 in the shock absorber 46 receive the protrusions 48 on flange 50. The driving member 44 is received in an opening 77 of the shock absorber 46. The shock absorber 46 is thus disposed between the flange 50 and the gearwheel 36.

The shock absorber and acts as a dampener at the maximum torsional load. A retaining member 53 is provided to reduce axially movement of the driver 42.

The operation of the motor assembly 30 begins when power supplied from a brushcard generates voltage to drive an armature inside the motor 32 to rotate the shaft 40. The worm 38 of the shaft 40 interfaces with the gearwheel 36 to generate torque. The rotational force generated from the gearwheel 36 transfers to the driver 42. Thus, gearwheel 36, shock absorber 46 and driver 42 all rotate together. The gear housing 34 protects the internal components (36, 46 and 42) of the gear unit 33 and mates with a cover structure 52 to prevent the gear unit 33 from disassembly. The driver 42 interfaces with a customer drumhousing (not shown) to move a vehicle window. Driving member 43 is received in an opening 51 (FIG. 7) in the cover structure 52, while driving member 44 is received in an opening 54 of the gear housing 34. Since the driver 42 can be interfaced from both the front end 35 and back end 37 of the gear unit 33 due to driving members 43 and 44, the customer needs only one identically configured motor assembly 30 for each window, instead of the conventional left and right handed motor assemblies. Thus, costs of assembly are reduced and the customer need not worry about orientation of the motor assembly 30 during assembly.

Since there is no gear axle in the gear unit 33, the concern for bending of the gear axle at harsh conditions on the motor assembly 30 is eliminated. This also eliminates a root cause for motor lock-up in the field.

In accordance with another aspect of the invention, as shown in FIGS. 5–9, the plastic cover structure 52 is connected to the plastic gear housing 34 via a snap-fit connection at one end of the gear housing 34, and with the use of a gasket 56 at another end of the gear housing 34. As best shown in FIGS. 7 and 8, the cover structure 52 is moved into a snap-fit arrangement with the gear housing 34 at end 58 thereof. The sequence of movement of the cover structure 52 in the direction of arrow A at different times (1, 2 and 3) is shown in FIG. 8. In addition, a gasket 56, preferably made of rubber or other elastomers, is sandwiched between surfaces of the cover structure 52 and gear housing 34 at end 60 of the gear housing 34. Gaskets (not shown) are used to seal the openings 51 and 54 in the gear unit that receive the driving members 43 and 44, respectively. These gaskets are preferably over-molded around the edges of each opening 51 and 54. In this manner, the internal parts of the gear unit 33 and motor 32 are sealed from the external environment.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A motor assembly comprising:
   an electric motor having a rotatable shaft, the shaft having a worm, and
   a gear unit coupled with the motor, the gear unit comprising:
      a gearwheel operatively coupled with the worm of the shaft such that rotation of the shaft rotates the gearwheel,
      a driver operatively coupled with gearwheel so as to rotate therewith, the driver having first and second driving members disposed in opposing relation,
      a gear housing defining one end of the gear unit, and
      a cover structure coupled to the gear housing and defining an opposing end of the gear unit, the gear housing and cover structure cooperating to house the gearwheel and driver, the gear housing having an opening receiving the first driving member and the cover structure having an opening receiving the second driving member so as to ensure that a driving member is accessible at each end of the gear unit,
   wherein the gearwheel is supported for rotation by the driver.

2. The motor assembly of claim 1, wherein the driver includes a generally cylindrical flange and the driving members extend from the flange in opposing directions.

3. The motor assembly of claim 2, wherein the flange includes protrusions extending therefrom, and wherein the gear unit further includes a shock absorber structure mounted with respect to the protrusions, with the shock absorber structure being disposed between the gearwheel and flange.

4. The motor assembly of claim 1, wherein one of the driving members of the driver is generally cylindrical and the gearwheel includes a central opening there through that receives the generally cylindrical driving member.

5. The motor assembly of claim 4, wherein the gear unit further includes a shock absorber structure having an opening there through, the opening of the shock absorber structure receiving the generally cylindrical driving member such that the driver, shock absorber structure and gearwheel rotate together.

6. The motor assembly of claim 1, wherein the cover structure and the gear housing are made of plastic and the cover structure is in snap-fitted engagement with the gear housing.

7. The motor assembly of claim 1, further including an elastomer gasket between a surface of the cover structure and a surface of the gear housing.

8. A motor assembly comprising:
   an electric motor having a rotatable shaft, the shaft having a worm, and
   a gear unit operatively associated with the motor the gear unit having first and second opposing ends and comprising:
      a gearwheel operatively coupled with the worm of the shaft such that rotation of the shaft rotates the gearwheel, and
      a driver operatively coupled with gearwheel so as to rotate therewith, the driver being constructed and arranged to provide a driving member accessible at each of the first and second ends of the gear unit,
   wherein the gearwheel is supported for rotation by the driver.

9. The motor assembly of claim 8, wherein the driver includes a generally cylindrical portion and the gearwheel includes a central opening there through that receives the generally cylindrical portion.

10. The motor assembly of claim 9, wherein the gear unit further includes a shock absorber structure having an opening there through, the opening of the shock absorber structure receiving the generally cylindrical driving member such that the driver, shock absorber structure and gearwheel rotate together.

11. A motor assembly comprising:

an electric motor having a rotatable shaft, the shaft having a worm, and a gear unit operatively associated with the motor, a gear unit having first and second opposing ends and comprising:

a gearwheel operatively coupled with the worm of the shaft such that rotation of the shaft rotates the gearwheel, and means, operatively coupled with gearwheel so as to rotate therewith, for providing a driving member accessible at each of the first and second ends of the gear unit, wherein the gearwheel is supported for rotation by the means for providing a driving member.

12. The motor assembly of claim 11, wherein the means for providing a driving member includes a single driver having first and second driving members defining opposing ends of the driver, with the first driving member being disposed at the first end of the gear unit and the second driving member being disposed at the second end of the gear unit.

13. A gear unit constructed and arranged to be coupled with an electric motor having a worm, the gear unit having first and second opposing ends and comprising:

a gearwheel constructed and arranged to be operatively coupled with the worm of the motor such that rotation of the worm rotates the gearwheel, and a driver operatively coupled with gearwheel so as to support the gearwheel for rotation therewith, the driver being constructed and arranged to provide a driving member accessible at each of the first and second ends of the gear unit.

* * * * *